(12) United States Patent
Fredin et al.

(10) Patent No.: US 6,524,001 B1
(45) Date of Patent: Feb. 25, 2003

(54) METHOD AND SYSTEM FOR SENSING OPTICAL FIBER TEMPERATURE

(75) Inventors: Leif Fredin, Austin, TX (US); Brendan Krenek, Georgetown, TX (US)

(73) Assignee: Systems and Processes Engineering Corp., Austin, TX (US)

(*) Notice: Subject to any disclaimer, the term of this patent is extended or adjusted under 35 U.S.C. 154(b) by 0 days.

(21) Appl. No.: 09/639,403

(22) Filed: Aug. 15, 2000

(51) Int. Cl.[7] .............................................. G01K 11/00
(52) U.S. Cl. ......................... 374/161; 374/120; 385/12
(58) Field of Search ................ 374/161, 120; 385/12

(56) References Cited

U.S. PATENT DOCUMENTS

| | | | |
|---|---|---|---|
| 4,244,045 A | * 1/1981 | Nosu et al. .................... 370/3 |
| 4,693,544 A | * 9/1987 | Yamasaki et al. ......... 350/96.16 |
| 4,714,829 A | 12/1987 | Hartog et al. |
| 4,767,219 A | * 8/1988 | Bibby .......................... 374/123 |
| 4,804,264 A | * 2/1989 | Kirchhofer et al. ............ 356/44 |
| 5,102,232 A | * 4/1992 | Tanabe et al. ............... 374/161 |
| 5,113,277 A | 5/1992 | Ozawa et al. |
| 5,272,334 A | 12/1993 | Sai |
| 5,292,196 A | 3/1994 | Iida et al. |
| 5,442,172 A | 8/1995 | Chiang et al. |
| 5,446,280 A | * 8/1995 | Wang et al. ............ 250/227.23 |
| 5,755,512 A | * 5/1998 | White .......................... 374/161 |
| 5,999,255 A | * 12/1999 | Dupée et al. ................ 356/301 |
| 6,040,191 A | * 3/2000 | Grow .......................... 436/172 |
| 6,271,968 B1 | * 8/2001 | Dobrowolski et al. ...... 359/583 |
| 6,285,446 B1 | * 9/2001 | Farhadiroushan .......... 356/35.5 |

FOREIGN PATENT DOCUMENTS

| | | | |
|---|---|---|---|
| JP | 02091532 A | * 3/1990 | .................. 374/121 |
| JP | 05157637 A | * 6/1993 | |

OTHER PUBLICATIONS

Anonymous, "Les Capteurs à fibres optiques opérationnels?", Mesures Regulation Automatisme Controle, vol. 51, No. 13, pp. 49–51, 53, 55–58, Oct. 20, 1986.

Grattan, K.T.V., "The use of fibre optic techniques for temperature measurement," Measurement +Control, vol. 20, No. 6, pp. 32–39, Jul. 1987.

International Search Report, PCT/US 01/25393.

\* cited by examiner

*Primary Examiner*—Diego Gutierrez
*Assistant Examiner*—Lydia M. De Jesús
(74) *Attorney, Agent, or Firm*—Baker Botts L.L.P.

(57) ABSTRACT

A system for sensing optical fiber temperature includes a laser that produces a first electromagnetic spectrum. A first optical filter receives the laser output and reflects it. The first optical filter transmits electromagnetic radiation having greater and lesser wavelengths than the laser output. The transmitted light reaches a second optical filter which reflects the light of lesser wavelength, but transmits the light of greater wavelength. A first detector is placed to received the reflected, lower-wavelength light and a second detector is place to receive the transmitted, higher-wavelength light.

3 Claims, 4 Drawing Sheets

METHOD AND SYSTEM FOR SENSING OPTICAL FIBER TEMPERATURE

TECHNICAL FIELD OF THE DISCLOSURE

The present disclosure relates in general to optical system monitoring, and, more particularly, to a method and system for sensing optical fiber temperature.

BACKGROUND

Optical fibers increasingly constitute the chief means for transmitting information through the world's telecommunications network. Certain characteristics of an optical fiber can also be used to generate information rather than just transmit it. Specifically, the temperature of an optical fiber affects the amount and wavelength of light that will be scattered in response to a transmitted pulse. Careful measurements of scattered light can therefore be used to determine the temperature at points along an optical fiber.

A time-limited pulse of light with an electromagnetic spectrum of average wavelength $\lambda$ can be sent through an optical fiber. As the pulse traverses the fiber, backward scattered light is produced. Two types of backward scattered light are of particular interest: Stokes light and anti-Stokes light. Stokes light constitutes an electromagnetic spectrum having an average wavelength above $\lambda$. Anti-Stokes light constitutes an electromagnetic spectrum having an average wavelength below $\lambda$. Other types of backward scattered light are also produced at wavelengths outside the Stokes and anti-Stokes spectra. The width of the Stokes and anti-Stokes spectra, as measured by the difference in wavelength between the points of 50% intensity, is often much greater than the spectrum width of the time-limited pulse, especially if that pulse is produced by a laser.

The Stokes and anti-Stokes light travels to the end of the fiber at which the pulse was introduced. The location from which the backward scattered light originated can be determined by the time between the introduction of the pulse and the receipt of the light. After a pulse is introduced into the fiber, backward scattered light is continuously received and time functions of the total intensity across the Stokes and anti-Stokes spectra can be determined. The temperature of a point in the fiber has a known relationship to the ratio of the anti-Stokes light produced at that point to the Stokes light produced at that point. Increasing the measurement accuracy of Stokes and anti-Stokes intensity as a function of time, increases the accuracy of the resulting calculation of temperature as a function of position in the fiber.

A temperature sensing fiber of greater sensitivity can be used to monitor conditions anywhere a fiber can be located. For example, a fiber can be run along a power cable to detect degradation at specific points along the cable. Fiber could also be used to detect fires along the length of the fiber, even over long distances.

U.S. Pat. No. 5,113,277 discloses a Fiber Optic Distributed Temperature Sensor System. The '277 patent contemplates introducing a light pulse from a light source into a fiber. The scattered light is then divided by wavelength with detectors positioned to receive the Stokes light and anti-Stokes light, respectively. The measurements made by the detectors are then introduced into an equation to determine the temperature at a certain distance.

The '277 patent discloses several different configurations for alternatively reflecting or transmitting various wavelengths of light in order to guide the pulse into the fiber and guide the Stokes and anti-Stokes responses to different detectors. Each of those configurations involves transmitting the pulse from the light source through one or more lenses within the optical wavelength division demultiplexer. The imperfections of conventionally available transmitting lenses cause an appreciable percentage of light to scatter rather than be transmitted. The scattered light is comparable in intensity to the Stokes and anti-Stokes reflections because the light source pulse is of much greater intensity than the back scattered radiation. The scattered light is spread over a wide angle. The scattered light introduces error into measurements and reduces the specificity of resulting calculations.

An additional difficulty with the conventional approach of using transmitting lenses is caused by the back scattering of Rayleigh light. Unlike Stokes and anti-Stokes light, Rayleigh light has wavelengths in the electromagnetic spectrum of the pulse from the light source. As with the source pulse, an appreciable percentage of the Rayleigh light is scattered rather than transmitted by the transmitting lenses. Measurement difficulties arise because the intensity of Rayleigh back scattered light is greater than the intensity of Stokes and anti-Stokes scattered light.

SUMMARY OF THE INVENTION

A method and system sensing optical fiber temperature is disclosed. None of the advantages disclosed, by itself, is critical or necessary to the disclosure.

A system for measuring optical fiber temperature includes a laser that produces at least a first electromagnetic spectrum at an output. A first optical filter includes a side that receives the first electromagnetic spectrum from the laser and reflects it in a specific direction. The first optical filter transmits a second electromagnetic spectrum having an average wavelength below that of the first and also transmits a third electromagnetic spectrum having an average wavelength above that of the first. A second optical filter is positioned to receive light received from the specific direction and transmitted through the first optical filter. The second filter reflects the second electromagnetic spectrum and transmits the third electromagnetic spectrum. One detector is positioned to received light reflected from the second optical filter. A second detector is positioned to receive light transmitted through the second optical filter.

A more specific system is also provided in which a third optical filter is positioned to receive light reflected from the second optical filter, transmits light in the second electromagnetic spectrum, but does not transmit light in the first or third electromagnetic spectra. A another more specific system is provided in which the optical filters are mounted in a case in fixed relation to each other and to collimating lenses through which the laser and the detectors are coupled to the filters. The case defines a sealed cavity. The air in the cavity is preferably as dust free as possible. As an alternative the cavity could be maintained at below atmospheric pressure or filled with a fluid other than air.

A method is provided for measuring optical fiber temperature. The method includes producing a first electromagnetic spectrum at the output of a laser. The first spectrum is then reflected off a first optical filter and guided into an optical fiber. Electromagnetic radiation at wavelengths falling into second and third spectra are then received from the fiber at the first optical filter. The second spectra has an average wavelength below the average of the first. The third has an average above the first. The first optical filter transmits the second and third spectra that are then received at a second optical filter. The second optical filter reflects the second spectrum, but transmits the third spectrum. Two detectors are positioned so that each receives one of the second and third spectra. A more specific embodiment of the method reflects at least 99.8% of the first spectra at the first optical filter, transmits at least 80% of the second and third spectra at the first optical filter, reflects at least 95% of the second spectra at the second optical filter, and transmits at least 80% of the third spectra at the second optical filter.

It is a technical advantage of the disclosed methods and systems that light spectra having average wavelengths both above and below the average wavelength of the source light are measured.

It is also a technical advantage of the disclosed methods and systems that the source light is reflected rather than transmitted to reduce scattered light.

Another technical advantage of the system and method disclosed is that nonreflected light scatters over a much smaller solid angle as compared to nontransmitted light. As a result, the nonreflected light can be contained more easily and even used to trigger a timing measurement.

Another technical advantage of the system and method disclosed is that a ratio of the intensity of light in the spectra with lesser average wavelength can be compared with the intensity of light in the spectra with greater average wavelength to determine temperature.

Another technical advantage of the system and method disclosed is that the time difference between the source light pulse and measurements can be used to determine the distance at which the temperature is calculated.

Another technical advantage of the system and method disclosed is that Rayleigh scattered light is reflected rather than transmitted to reduce scattered light.

Another technical advantage of the system and method disclosed is that collimating lenses reduce intensity loss.

Other technical advantages of the present disclosure will be readily apparent to one skilled in the art from the following figures, descriptions, and claims. Various embodiments of the invention obtain only a subset of the advantages set forth. No one advantage is critical to the invention. For example, one embodiment of the present invention may only provide the advantage of measuring light spectra having average wavelengths both above and below the average wavelength of the source light, while other embodiments may provide several of the advantages.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE DISCLOSURE

Figure 1:
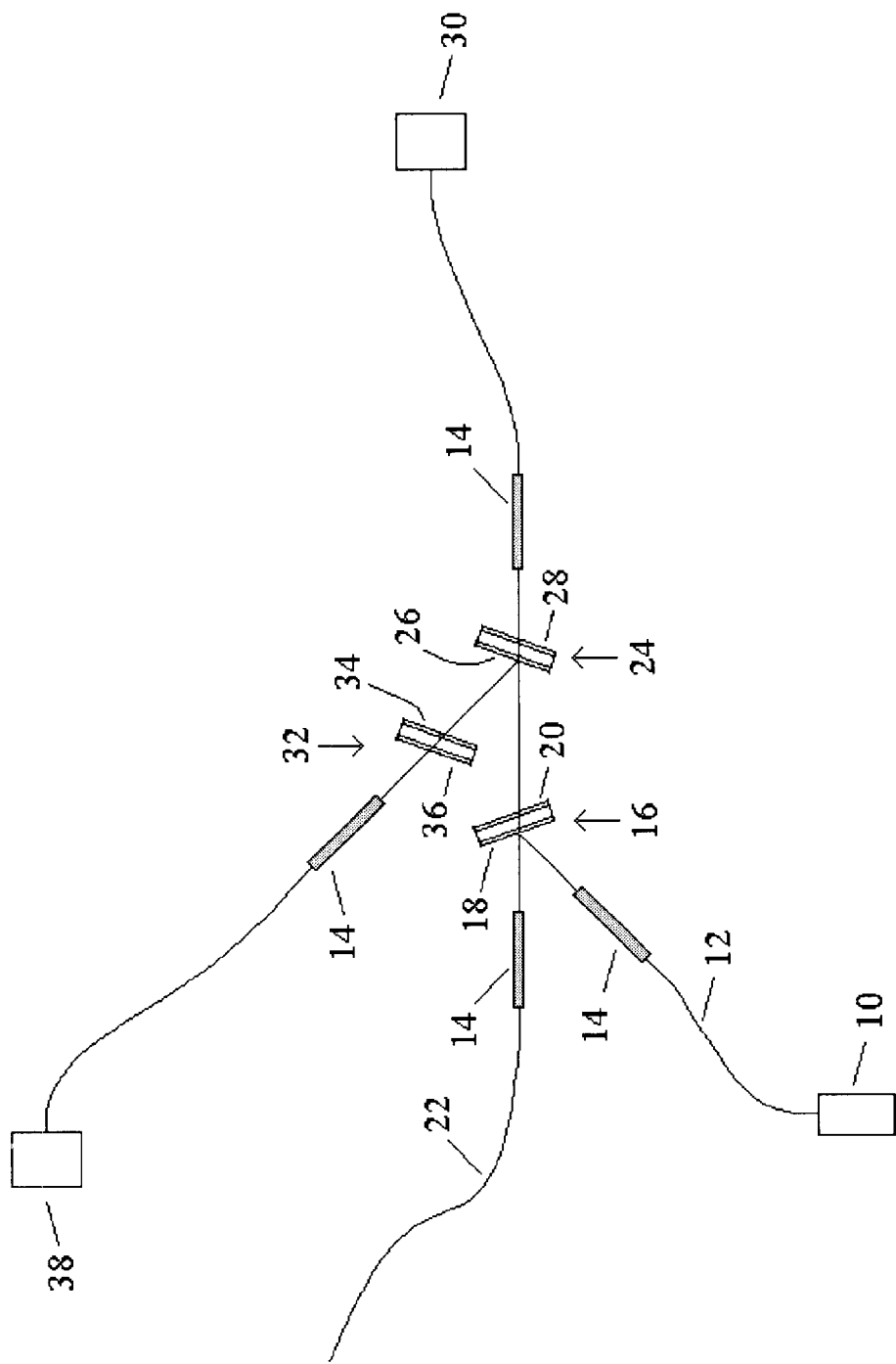
FIG. 1 is a diagram of a system for measuring back scattering from an optical fiber in accordance with one embodiment of the present invention.

FIG. 1 is a diagram of a system for measuring back scattering from an optical fiber in accordance with one embodiment of the present invention. A laser 10 produces at least a first electromagnetic spectrum at an output that is coupled to an optical fiber 12. The first electromagnetic spectrum produced by the laser 10 is preferably narrow as measuring by the difference in wavelength between the points of half intensity. In one embodiment, the laser 10 is a small frame micro laser with a wavelength of 1064 nanometers provided by JDS Uniphase.

The optical fiber 12 is coupled to a graded refractive index collimator 14 or GRIN 14. In one embodiment, the GRIN 14 is a Gradium collimating lens available from LightPath, Inc. The GRIN 14 can have either axial or radial gradient. In one embodiment, the GRIN 14 has a gradient in the refractive index in the radial direction. The GRIN 14 functions to collimate the light and decrease spot size so that less intensity is lost. The GRIN 14 is aimed to project light onto the first side 18 of a first optical filter 16. In one embodiment, the optical filters are filters obtained from Barr Associates. It is desirable that the optical filters be aligned so that light strikes their surfaces at close to perpendicular. The first side 18 of the first optical filter 16 reflects the first electromagnetic spectrum produced by the laser 10 in the direction of a GRIN 14 attached to an optical fiber 22. It is desirable that at least 99.8% of light in the first spectrum be reflected. The GRIN 14 focuses the received light to a spot size appropriate for the fiber 22 to reduce intensity loss.

Back scattered light from the optical fiber 22 is collimated by the GRIN 14 and projected onto the first side 18 of the first optical filter 16. Anti-Stokes light is back scattered through optical fiber 22 in a second electromagnetic spectrum having a lesser average wavelength than the first electromagnetic spectrum. Stokes light is back scattered in a third electromagnetic spectrum having a greater average wavelength than the first electromagnetic spectrum. A majority of the Rayleigh light is back scattered in wavelengths of the first electromagnetic spectrum. The first side 18 of the first optical filter 16 transmits the Stokes and anti-Stokes light. It is desirable that at least 80% of the light in the second and third spectra be transmitted. It is preferable that at least 90% of the light in the second and third spectra be transmitted. A majority of the Rayleigh light is reflected by the first filter 16 because its wavelength falls within the first electromagnetic spectrum as did the light produced by the laser 10. The back side 20 of the first optical filter 16 has an anti-reflective coating so that it transmits wavelengths in the first, second, and third spectra.

A second optical filter 24 is located in the path of light emerging from the optical fiber 22 and traversing the first optical filter 16. The second side 26 of the second optical filter 24 reflects the anti-Stokes light. It is desirable that at least 95% of the light in the second electromagnetic spectrum be reflected. It is preferable that at least 99.5% of the light in the second electromagnetic spectrum be reflected. The second side 26 of the second optical filter 24 transmits the Stokes light. It is desirable that at least 80% of the light in the third spectrum be transmitted. It is preferable that at least 90% of the light in the third spectrum be transmitted. The back side 28 of the second optical filter 24 can be covered with an anti-reflective coating. In an alternative embodiment the back side 28 of the second optical filter 24 transmits the third electromagnetic spectrum, but does not transmit the first and second electromagnetic spectra.

A GRIN 14 is positioned to receive Stokes light that traverses the first and second optical filters 16,24 after leaving the optical fiber 22. The GRIN 14 focuses the light into an optical fiber that connects to a light detector 30.

A third optical filter 32 is positioned to receive light reflected from the second side 26 of the second optical filter 24. The third side 34 of the third optical filter 32 transmits anti-Stokes light, but does not transmit Stokes or Rayleigh light. The back side 36 has an anti-reflective coating. A GRIN 14 is positioned to receive anti-Stokes light that reflects off the second side 26 of the second filter 24 and traverses the third filter 32. The GRIN 14 focuses the light into an optical fiber that connects to a light detector 38.

Figure 2:
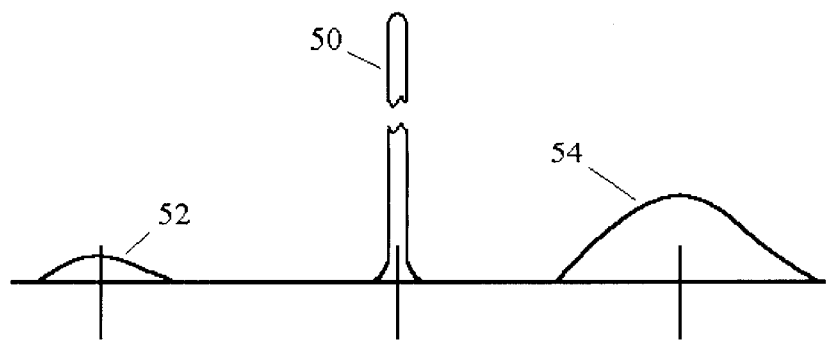
FIG. 2 is a chart of electromagnetic spectra.

FIG. 2 is a chart of electromagnetic spectra involved in obtaining measurements for calculating temperature along an optical fiber. The horizontal axis represents wavelength, while the vertical axis represents intensity. The laser output 50 has a narrow spectrum of wavelengths. The exact shape of the wavelength profile depends on the light pulse source. As shown, the laser 50 output has a high average intensity relative to the other spectra.

The anti-Stokes light 52 is distributed over a spectrum with a lower average wavelength than that of the laser output 50. The Stokes light 54 is distributed over a spectrum with a higher average wavelength than that of the laser output 50. The laser output 50 enters the optical fiber 22 and begins to decrease in intensity as Rayleigh, Stokes, and anti-Stokes light is back scattered from the pulse. The Rayleigh spectrum is not shown, but generally consists of wavelengths centered at the average wavelength of the laser output 50. The Rayleigh light generally has higher intensity than the Stokes and anti-Stokes light. The Stokes and anti-Stokes spectra 52,54 are shown for one point in time. Later spectra 52,54 will have decreased intensity because they originate further away in the fiber 22 and the laser output 50 that is generating the back scattered light has decreased in intensity by the time it reaches that point. Because temperature is determined by the ratio of the anti-Stokes 52 and Stokes 54 light, equal percentage decreases in intensity of both spectra does not make the calculation inaccurate.

Figure 3A:
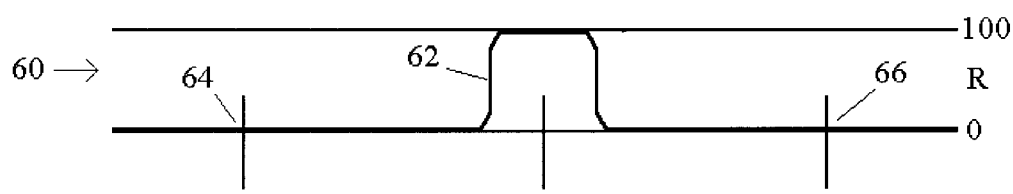
FIG. 3a is a chart of reflectance characteristics for an optical filter.

FIG. 3a is a chart of reflectance characteristics 60 for the first side 18 of the first optical filter 16. The first side 18 is designed to reflect most light having a wavelength in the interval 62, such as light in the spectrum 50 produced by the laser 10, while transmitting 64,66 the wavelengths that comprise the Stokes and anti-Stokes light. Rayleigh back scattered light is also blocked to some extent because its wavelength spectrum is similar to that of the laser. While the chart shows 100% reflectance for the laser source wavelengths and 0% reflectance for the Stokes and anti-Stokes wavelengths, that is only the goal. Perfectly reflecting and transmitting coatings are not commercially available. It is desirable that at least 99.8% of the laser output light 50 be reflected. It is also desirable that at least 80% of the Stokes and anti-Stokes light be transmitted. A transmittance of those wavelengths of over 90% is preferred.

Figure 3B:
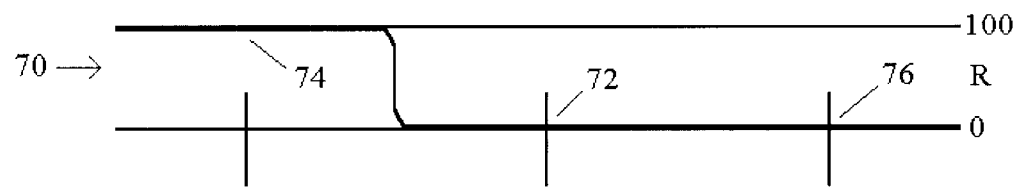
FIG. 3b is a chart of reflectance characteristics for an optical filter.

FIG. 3b is a chart of reflectance characteristics 70 for the second side 26 of the second optical filter 24. The second side 26 is designed to reflect 74, a majority of the anti-Stokes light 52, while transmitting 72,76 the wavelengths that comprise the Stokes and source light. While the chart shows 100% reflectance for the anti-Stokes wavelength and 0% reflectance for the Stokes and source wavelengths, that is only the goal. Perfectly reflecting and transmitting coatings are not commercially available. It is desirable that at least 95% of the anti-Stokes light 52 be reflected and 99.5% reflectance is preferred. It is also desirable that at least 80% of the Stokes light be transmitted. A transmittance of those wavelengths of over 90% is preferred.

Figure 3C:
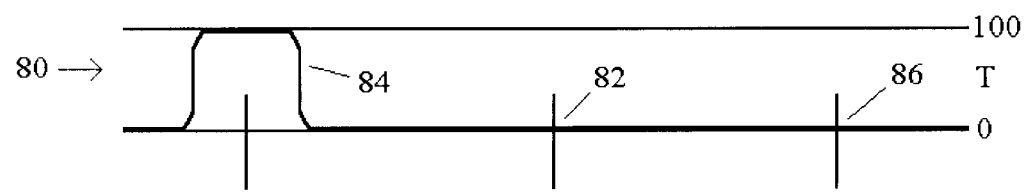
FIG. 3c is a chart of transmittance characteristics for an optical filter.

FIG. 3c is a chart of transmittance characteristics 80 for the third side 34 of the third optical filter 32. The third side 34 is designed to transmit 84, a majority of the anti-Stokes light 52, while not transmitting 82,86 the wavelengths that comprise the Stokes and source light. While the chart shows 100% transmittance for the anti-Stokes wavelength and 0% transmittance for the Stokes and source wavelengths, that is only the goal. Perfectly reflecting and transmitting coatings are not commercially available. It is desirable that at least 80% of the anti-Stokes light be transmitted. A transmittance of those wavelengths of over 90% is preferred. The back sides 20,28,36 of the optical filters can be covered with an anti-reflective coating which has high transmittance for all three spectra. In alternative embodiments, the back sides can be used to block unwanted wavelengths.

Figure 4:
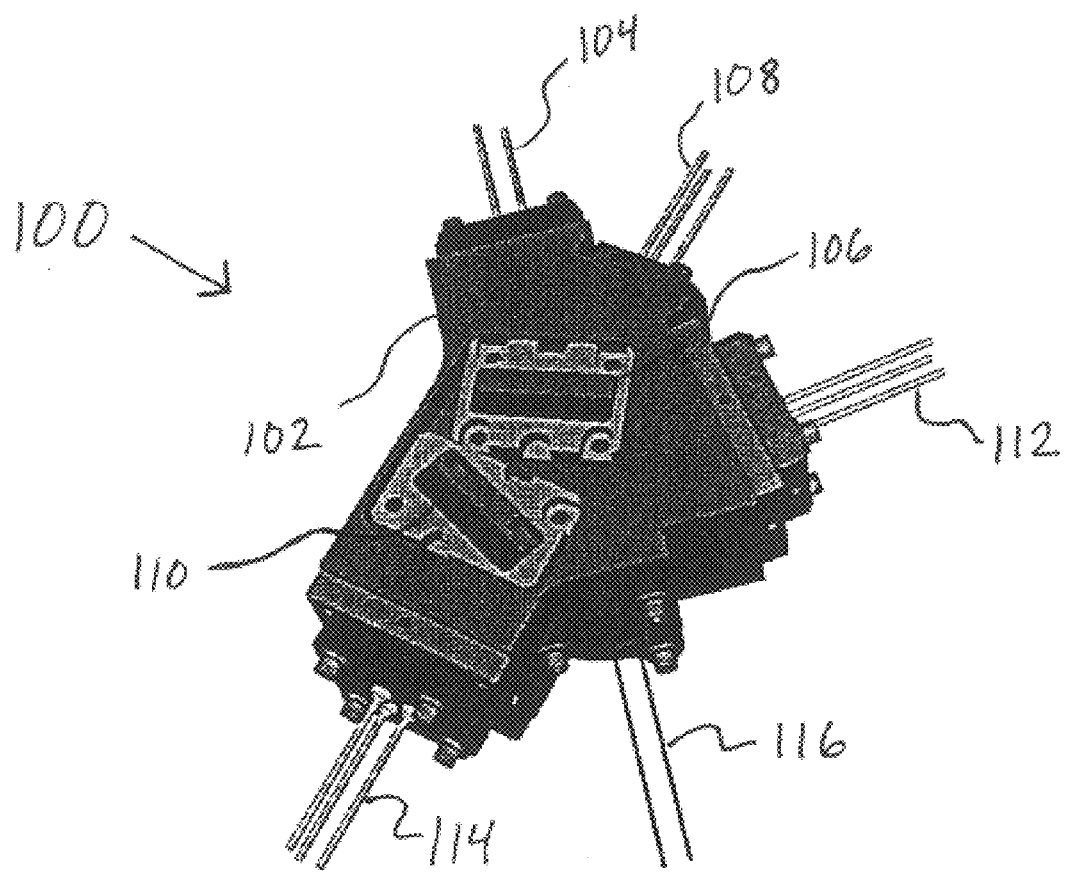
FIG. 4 is a top view of a system for separating back scattered light in accordance with one embodiment of the present invention.

FIG. 4 is a top view of a system 100 for separating back scattered light in accordance with one embodiment of the present invention. The system can measure one or more optical fibers at the same time. The case 102 has apertures for source light provided through fiber optics 104. The first filter is mounted in a first cartridge 106 that is inserted into the case 102 at an angle so that source light is reflected to outputs 108 that are connected to the optical fiber to be measured. Returning back scattered light that traverses the filter in the first cartridge 106 encounters the second filter mounted in a second cartridge 110 that is inserted into the case 102 at an angle so that reflected light is focused on outputs 112 connected to anti-Stokes measuring devices or detectors. Light that traverses both filters is received at outputs 114 that are connected to Stokes measuring devices or detectors. Pulse detection outputs 116 are placed opposite the source light inputs 104 to detect the very small amounts of light from the source that traverses rather than reflects from the first filter. Two purposes are served. First, the light is directed out of the case 102 so that it does not accidentally exit through one of the measurement outputs 112,114. Second the light accurately times the initiation of the pulse so that the fiber distance corresponding to anti-Stokes and Stokes light can be more accurately calculated.

Figure 5:
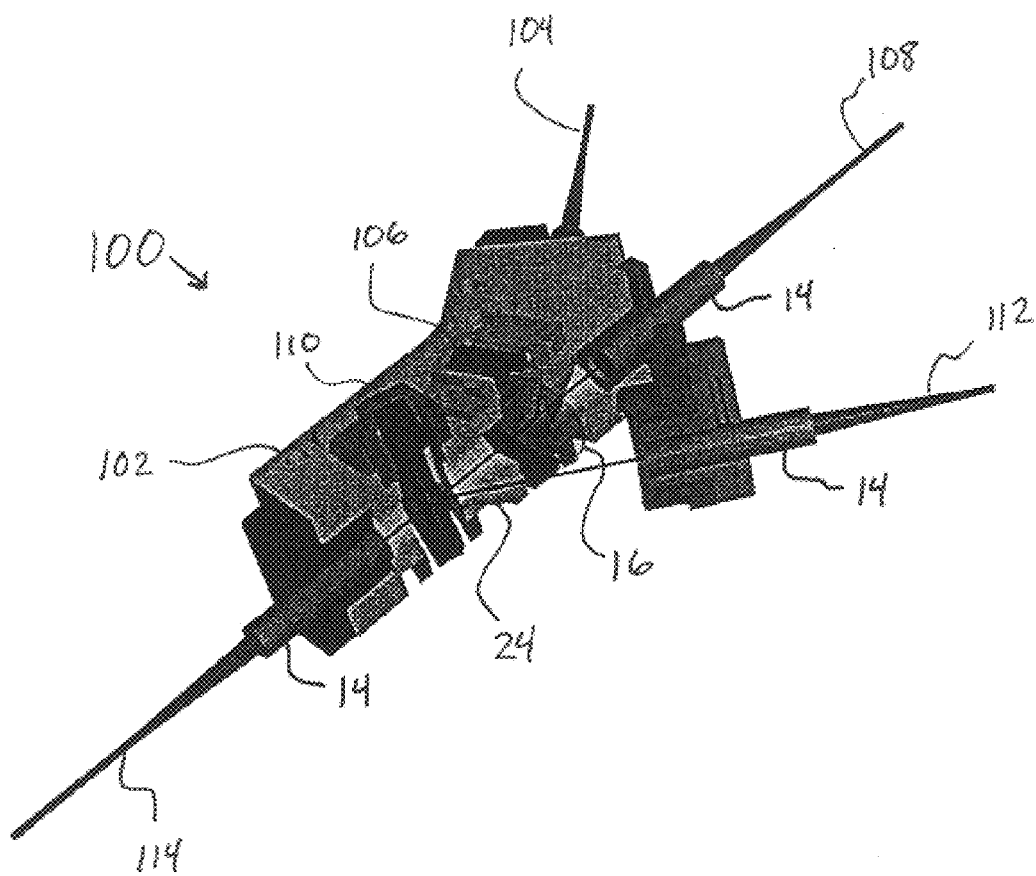
FIG. 5 is a cut away view of a system for separating back scattered light in accordance with one embodiment of the present invention.

FIG. 5 is a cut away view of a system 100 for separating back scattered light in accordance with one embodiment of the present invention. The interior light paths are shown as light directed through a optical fiber 104 from the source reflects from the first filter 16, which is mounted in the first cartridge 106, into the fiber 108 that is used to detect temperature. The back scattered light is transmitted through the first filter 16 and encounters the second filter 24 where the anti-Stokes light is reflected to an output 112. The Stokes light is shown traversing both filters and leaving the case 102 through an output 114. The cut away view allows the GRINs 14 that are located in case 102 apertures to be seen. The GRINs 14 collimate light entering the case from a fiber and focus light leaving the case into a fiber. The case cavity is kept as dust free as possible so as to minimize attenuation of the light.

Although the present disclosure has been described in detail, it should be understood that various changes, substitutions and alterations can be made thereto without departing from the spirit and scope of the invention as defined by the appended claims.

What is claimed is:

1. A system for measuring optical fiber temperature comprising:

a laser having an output and producing at least a first electromagnetic spectrum at the output;

a first optical filter having a first side;

the first side coupled to the output of the laser, reflective of the first electromagnetic spectrum, oriented to reflect the first electromagnetic spectrum in a first direction, transmissive of a second electromagnetic spectrum having a lesser average wavelength than the first electromagnetic spectrum and received from the first direction, and transmissive of a third electromagnetic spectrum having a greater average wavelength than the first electromagnetic spectrum and received from the first direction;

a second optical filter having a second side;

the second side aligned in the path of electromagnetic radiation received from the first direction and transmitted through the first optical filter, reflective of the second electromagnetic spectrum, oriented to reflect the second electromagnetic spectrum in a second direction, and transmissive of the third electromagnetic spectrum;

a first detector, coupled to electromagnetic radiation reflected in the second direction and sensitive to at least the second electromagnetic spectrum;

a second detector, coupled to electromagnetic radiation transmitted through the second optical filter and sensitive to at least the third electromagnetic spectrum; and a third optical filter having a third side, the third side aligned in the path of the electromagnetic radiation reflected in the second direction, transmissive of the second electromagnetic spectrum, and nontransmissive of the first and third electromagnetic spectra.

2. The system of claim 1, wherein the third optical filter has an antireflective coating on the side opposite the third side.

3. A method for measuring optical fiber temperature comprising the steps of:

producing at least a first electromagnetic spectrum at the output of a laser;

reflecting the first electromagnetic spectrum off a first optical filter;

guiding the reflected first electromagnetic spectrum into a first optical fiber;

receiving second and third electromagnetic spectra at the first optical filter, the second electromagnetic spectrum having a lesser average wavelength than the first electromagnetic spectrum, the third electromagnetic spectrum having a greater average wavelength than the first electromagnetic spectrum;

transmitting the second and third electromagnetic spectra through the first optical filter;

receiving the second and third electromagnetic spectra at a second optical filter;

reflecting the second electromagnetic spectrum off the second optical filter;

transmitting the third electromagnetic spectrum through the second optical filter;

receiving the reflected second electromagnetic spectrum at a first detector;

receiving the transmitted third electromagnetic spectrum at a second detector;

receiving the reflected second electromagnetic spectrum at a third optical filter, the third optical filter nontransmissive of the first and third electromagnetic spectra;

transmitting the second electromagnetic spectrum through the third optical filter;

and thereby measuring a temperature of the first optical fiber.

* * * * *